United States Patent
Matsuto et al.

(10) Patent No.: US 10,718,412 B2
(45) Date of Patent: Jul. 21, 2020

(54) SENSOR TARGET, MOVABLE-PART UNIT COMPRISING THE TARGET, AND ELECTRIC ACTUATOR

(71) Applicant: NTN CORPORATION, Osaka (JP)

(72) Inventors: Takushi Matsuto, Shizuoka (JP); Shinsuke Hirano, Shizuoka (JP); Atsushi Ikeda, Shizuoka (JP); Tomomi Ishikawa, Shizuoka (JP)

(73) Assignee: NTN CORPORATION, Osaka (JP)

( * ) Notice: Subject to any disclaimer, the term of this patent is extended or adjusted under 35 U.S.C. 154(b) by 46 days.

(21) Appl. No.: 16/085,078

(22) PCT Filed: Mar. 24, 2017

(86) PCT No.: PCT/JP2017/012196
§ 371 (c)(1),
(2) Date: Sep. 14, 2018

(87) PCT Pub. No.: WO2017/170293
PCT Pub. Date: Oct. 5, 2017

(65) Prior Publication Data
US 2019/0078671 A1    Mar. 14, 2019

(30) Foreign Application Priority Data

Mar. 30, 2016 (JP) .................................. 2016-069096

(51) Int. Cl.
*F16H 25/24* (2006.01)
*G01D 5/245* (2006.01)
(Continued)

(52) U.S. Cl.
CPC ......... *F16H 25/2454* (2013.01); *F16H 25/20* (2013.01); *F16H 25/2204* (2013.01);
(Continued)

(58) Field of Classification Search
CPC .. F16H 25/2454; F16H 25/2204; F16H 5/245; H02K 7/06
See application file for complete search history.

(56) References Cited

U.S. PATENT DOCUMENTS

| 6,326,716 B1 * | 12/2001 | Niimi ................... H01R 39/381 310/239 |
| 8,516,916 B2 * | 8/2013 | Scott ........................ H02K 7/06 74/473.36 |

(Continued)

FOREIGN PATENT DOCUMENTS

| EP | 1 832 851 | 9/2007 |
| JP | 2005-9996 | 1/2005 |

(Continued)

OTHER PUBLICATIONS

Extended European Search Report dated Nov. 11, 2019 in corresponding European Patent Application No. 17774830.8.
(Continued)

*Primary Examiner* — David M Fenstermacher
(74) *Attorney, Agent, or Firm* — Wenderoth, Lind & Ponack, L.L.P.

(57) ABSTRACT

A sensor target of the present invention is mounted to a movable part (24), which is arranged in parallel with an output shaft (10a) of a motor (10), and is configured to perform a linear motion in a direction parallel to the output shaft (10a). The sensor target includes a magnet (73) and a magnet holder (74) configured to hold the magnet (73). One pair or a plurality of pairs of fitting claws (741) capable of being fitted to an outer peripheral surface of the movable part (24) are formed on the magnet holder (74).

14 Claims, 14 Drawing Sheets

(51) Int. Cl.
  *H02K 7/06* (2006.01)
  *G01D 5/12* (2006.01)
  *F16H 25/20* (2006.01)
  *F16H 25/22* (2006.01)

(52) U.S. Cl.
  CPC ............... *F16H 25/24* (2013.01); *G01D 5/12* (2013.01); *G01D 5/245* (2013.01); *H02K 7/06* (2013.01)

(56) References Cited

U.S. PATENT DOCUMENTS

| | | | | |
|---|---|---|---|---|
| 2007/0289397 | A1* | 12/2007 | Ritter | E05F 5/00 74/22 A |
| 2009/0241715 | A1* | 10/2009 | Tanaka | F16H 61/32 74/473.12 |
| 2009/0247364 | A1* | 10/2009 | Sano | B60T 13/746 477/197 |
| 2012/0036953 | A1* | 2/2012 | Tarasinski | F16D 23/06 74/336 R |
| 2012/0260763 | A1* | 10/2012 | Terao | G05G 1/08 74/507 |
| 2013/0220073 | A1* | 8/2013 | Suto | F16H 1/16 74/606 R |
| 2014/0353071 | A1 | 12/2014 | Ando et al. | |
| 2015/0362067 | A1* | 12/2015 | Mitteer | F16H 61/22 74/490.07 |
| 2016/0146333 | A1* | 5/2016 | Jeon | G05G 5/03 74/473.12 |
| 2016/0250924 | A1* | 9/2016 | Kouzuma | G05G 5/03 74/89 |
| 2017/0336287 | A1* | 11/2017 | Wagner | G01M 13/021 |
| 2018/0202836 | A1 | 7/2018 | Gorai et al. | |
| 2018/0205305 | A1* | 7/2018 | Chang | H02K 41/031 |

FOREIGN PATENT DOCUMENTS

| | | |
|---|---|---|
| JP | 5243018 | 7/2013 |
| JP | 5417132 | 2/2014 |
| JP | 2014-232035 | 12/2014 |
| WO | 2017/038318 | 3/2017 |

OTHER PUBLICATIONS

International Search Report dated Jun. 27, 2017 in International (PCT) Application No. PCT/JP2017/012196.
International Preliminary Report on Patentability and Written Opinion of the International Searching Authority dated Oct. 2, 2018 in International (PCT) Application No. PCT/JP2017/012196.

* cited by examiner

SENSOR TARGET, MOVABLE-PART UNIT COMPRISING THE TARGET, AND ELECTRIC ACTUATOR

TECHNICAL FIELD

The present invention relates to a sensor target, a movable-part unit comprising the target, and an electric actuator.

BACKGROUND ART

In recent years, electrification of automobiles and the like has been promoted for the purpose of power saving and reduction in fuel consumption. For example, a system for operating an automatic transmission, a brake, a steering wheel, and the like of the automobile with use of power of an electric motor such as a motor has been developed and brought to the market. As an electric actuator for use in such an application, there has been known an electric actuator employing a ball screw mechanism configured to convert a rotary motion generated through drive by a motor into a motion in a linear direction (see Patent Literature 1).

Moreover, in the actuator of this type, it is important to control a stroke amount or a position in a stroke direction of an operation part (namely, an actuator head) configured to output the linear motion. Thus, as means for detecting the stroke amount or the position in the stroke direction, for example, there has been given a method of coupling a link mechanism that includes a plurality of link members to a movable part (namely, a stroke shaft) performing the linear motion, and detecting an angle of the link members to detect a position of the movable part (see Patent Literature 2).

CITATION LIST

Patent Literature 1: JP 5243018 B2
Patent Literature 2: JP 5417132 B2

SUMMARY OF INVENTION

Technical Problem

Through the detection of the angle of the link coupled to the movable part in such a manner, the position information on the movable part can directly be acquired compared to, for example, the case in which the rotation angle of the motor is used to calculate the position of the movable part. Thus, a problem such as a backlash of component parts is less likely to occur, and an increase in detection precision is expected. However, in the position detection device using the link mechanism, the number of parts required for the position detection increases. The increase in the number of parts leads to an increase in size of the product. Therefore, in consideration of series production of the electric actuator of this type for the above-mentioned reason, the position detection device using the link mechanism is not always considered as an appropriate configuration.

Moreover, even the position detection device using the link mechanism is not free from the backlash of the link members, and it is thus still difficult to acquire a sufficient position detection precision.

Thus, it is conceivable that, for example, the position detection device is constructed by a sensor target and a non-contact sensor configured to detect the target in a non-contact manner. In this case, a mounting position of the sensor target to the movable part is important. The reason is as follows. That is, even when the position of the sensor target can be detected by the non-contact sensor, in a case in which the position of the sensor target is displaced from a preset position, a position of the actuator head, which is to finally be acquired, may not accurately be known.

The present invention has been made in view of the above-mentioned problem, and therefore has a technical object to detect, in a simple and highly precise manner, a position of an actuator head by enabling mounting of a sensor target to a movable part without backlash, to thereby achieve downsizing and series production of the electric actuator at low cost.

Solution to Problem

The above-mentioned object is achieved by a sensor target according to one embodiment of the present invention. That is, the sensor target forms an electric actuator configured to convert a rotary motion generated through drive by a motor into a linear motion in a direction parallel to an output shaft of the motor to output the linear motion, and is mounted to a movable part, which is arranged in parallel with the output shaft and is configured to perform the linear motion. The sensor target comprises: a magnet; and a magnet holder configured to hold the magnet. One pair or a plurality of pairs of fitting claws capable of being fitted to an outer peripheral surface of the movable part are formed on the magnet holder.

In the sensor target according to the one embodiment of the present invention, the one pair or the plurality of pairs of fitting claws, which are configured to be fitted to the outer peripheral surface of the movable part, are formed on the magnet holder configured to hold the magnet. With the sensor target having such a configuration, an operator can mount the magnet to the movable part, for example, through so-called snap fitting through use of elasticity of the paired fitting claws. Thus, the magnet can reliably be mounted to the movable part without backlash, and excellent detection precision can be acquired compared to the related art. Moreover, the mounting can be carried out without adhesive, screws, or the like. Thus, only a very simple operation is required, and hence ease of operation is also excellent. Moreover, through use of the sensor target comprising the magnet, the position of the magnet can be detected in the non-contact manner by the magnetic sensor. Thus, the number of parts required for the position detection can be reduced compared to the related art, thereby being capable of reducing a size of an electric actuator comprising the target and the movable part. As a matter of course, when the sensor target has such a simple configuration, and can be mounted to the movable part through such a simple operation, manufacturing cost and working cost can also be suppressed to low, which is preferred also for the series production of the electric actuator.

In the sensor target according to one embodiment of the present invention, the magnet holder may comprise: the fitting claws; and a fitting recessed portion, which is formed on an opposite side of a protruding side of the fitting claws, and is configured to receive the magnet fitted therein.

Through formation of the fitting recessed portion in such a manner, the mounting of the magnet to the magnet holder is facilitated. Moreover, through formation of the fitting recessed portion on the opposite side of the protruding side of the fitting claws, a mounting position (position in a circumferential direction) of the magnet to the movable part can be matched with a mounting position (position in the circumferential direction) of the sensor target. Thus, the positioning can also intuitively be performed.

In the sensor target according to one embodiment of the present invention, the fitting recessed portion may comprise: a pair of side wall portions; a first sandwiching portion, which is formed integrally with the pair of side wall portions; and a second sandwiching portion, which is formed independently of the pair of side wall portions and the first sandwiching portion, and is capable of sandwiching the magnet together with the first sandwiching portion.

In this case, in the sensor target according to one embodiment of the present invention, the fitting recessed portion may comprise an opening portion on a side opposite to the first sandwiching portion, and the magnet and the second sandwiching portion may be insertable from a side of the opening portion toward the fitting recessed portion.

Through formation of one (second sandwiching portion) of the pair of sandwiching portions configured to sandwich the magnet independently of another (first sandwiching portion) of the pair of sandwiching portions in such a manner, the mounting of the magnet to the fitting recessed portion is further simplified. In this case, through formation of the opening portion particularly in the periphery of the fitting recessed portion, the magnet and the second sandwiching portion are insertable from the side of the opening portion. Thus, a mounting performance of the magnet further increases.

The sensor target described above can suitably be provided as, for example, a movable-part unit comprising: the sensor target; and the movable part to which the sensor target is mounted through fitting.

In this case, in the movable-part unit according to one embodiment of the present invention, a cutout portion may be formed in the movable part, and the sensor target may be fitted to the cutout portion.

Through formation of the cutout portion in the movable part in such a manner, an abutment surface between the cutout portion and the magnet holder has a so-called non-perfect circle shape in section, which is different from the outer peripheral surface (usually having a perfect circle shape in section) of the movable part. Thus, when the sensor target is mounted to the cutout portion through the fitting claws, the cutout portion acts as a rotation stopper for the sensor target and the magnet forming the sensor target. Thus, the position of the magnet can accurately be detected by preventing a displacement in the circumferential direction of the magnet during and after the mounting. Moreover, in a case in which the cutout portion is formed in the movable part, and the sensor target is mounted to the cutout portion, the sensor target and the movable part are held in abutment against one another also in an axial direction (namely, a linear motion direction of the movable part). Thus, the displacement of the magnet in the axial direction can be prevented. Also with this, the position of the magnet can accurately be detected.

The movable-part unit described above can suitably be provided as, for example, an electric actuator comprising: the movable-part unit; and a magnetic sensor, which is arranged around the movable part, and is configured to detect a position of the magnet.

Alternatively, in this case, the electric actuator according to one embodiment of the present invention may further comprise: the motor; and a motion conversion mechanism configured to convert a rotary motion generated through drive by the motor into a linear motion in a direction parallel to an output shaft of the motor. In this case, the movable-part unit forms the motion conversion mechanism.

Advantageous Effects of Invention

According to one embodiment of the present invention, through mounting of the sensor target to the movable part without backlash, a position of the actuator head can be detected in a simple and highly precise manner. Thus, downsizing of the electric actuator and series production can be achieved at low cost.

DESCRIPTION OF EMBODIMENTS

Now, description is made of the present invention with reference to the accompanying drawings. In the respective drawings for illustrating the present invention, components such as members and component parts having the same functions or shapes are denoted by the same reference symbols as long as the components can be distinguished, and description thereof is therefore omitted after the description is made once.

Figure 1:
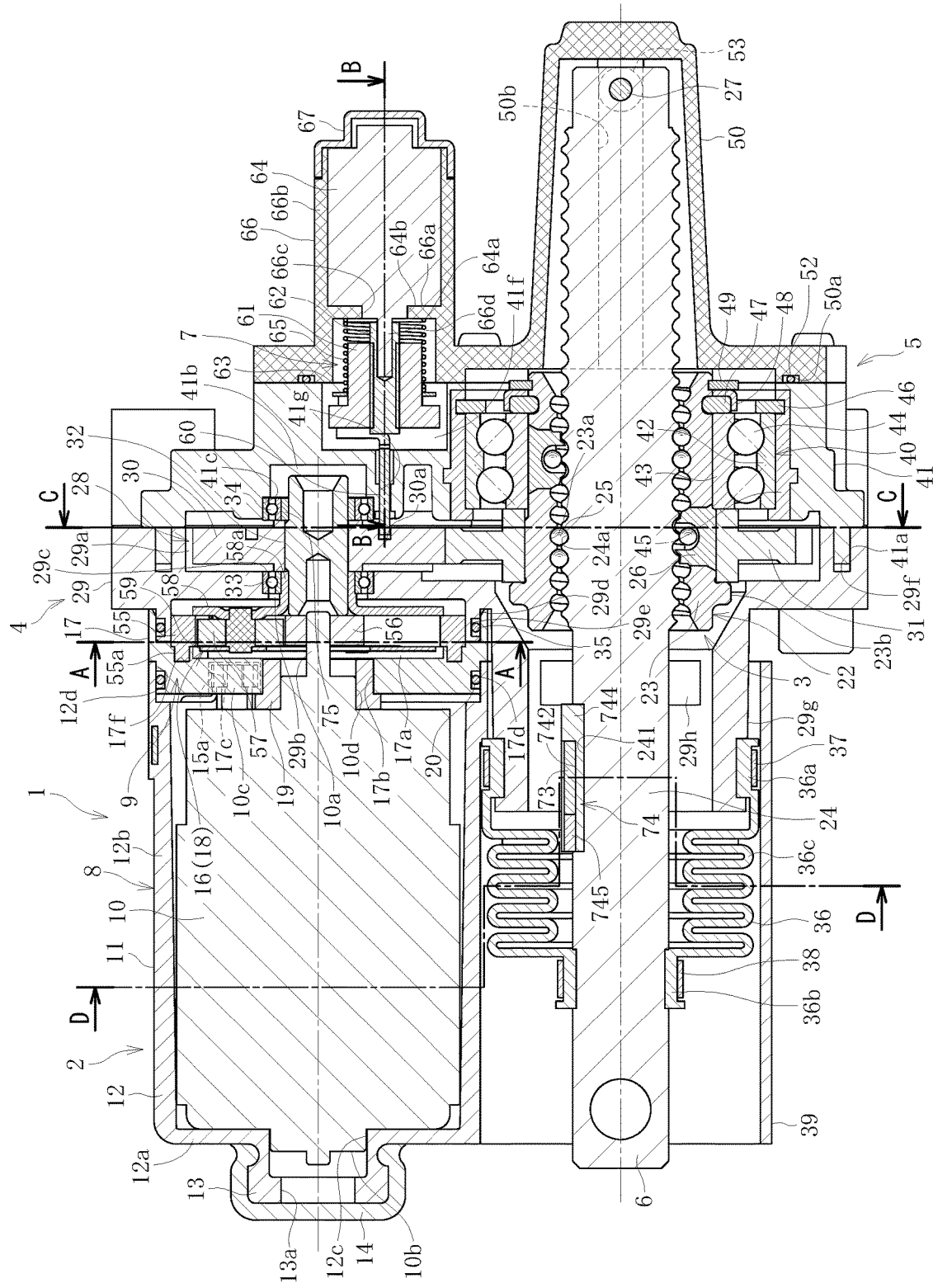
FIG. 1 is a vertical sectional view of an electric actuator according to one embodiment of the present invention.
Figure 2:
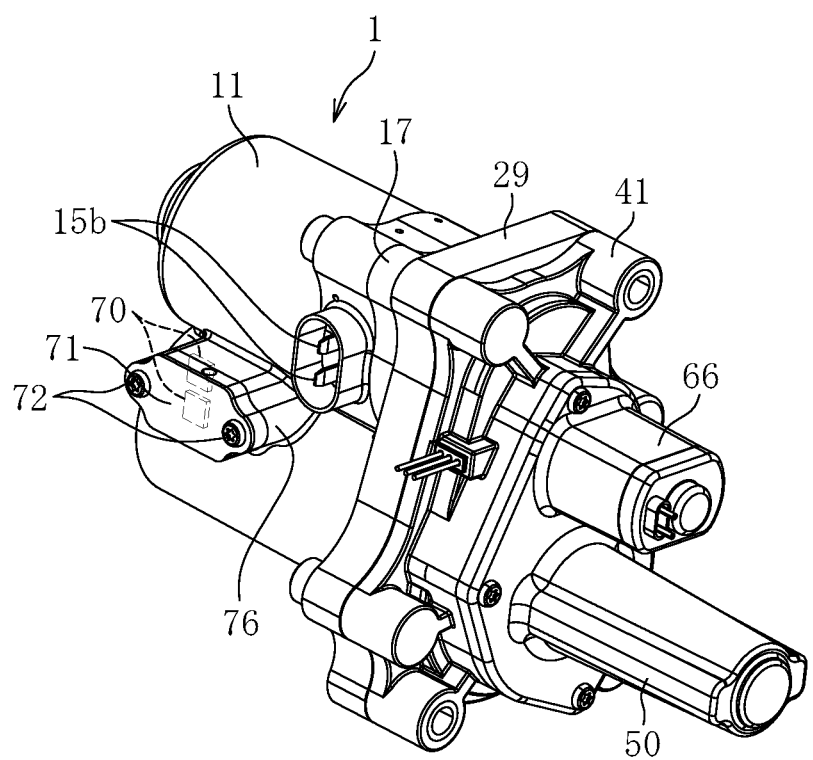
FIG. 2 is an external perspective view of the electric actuator.
Figure 3:
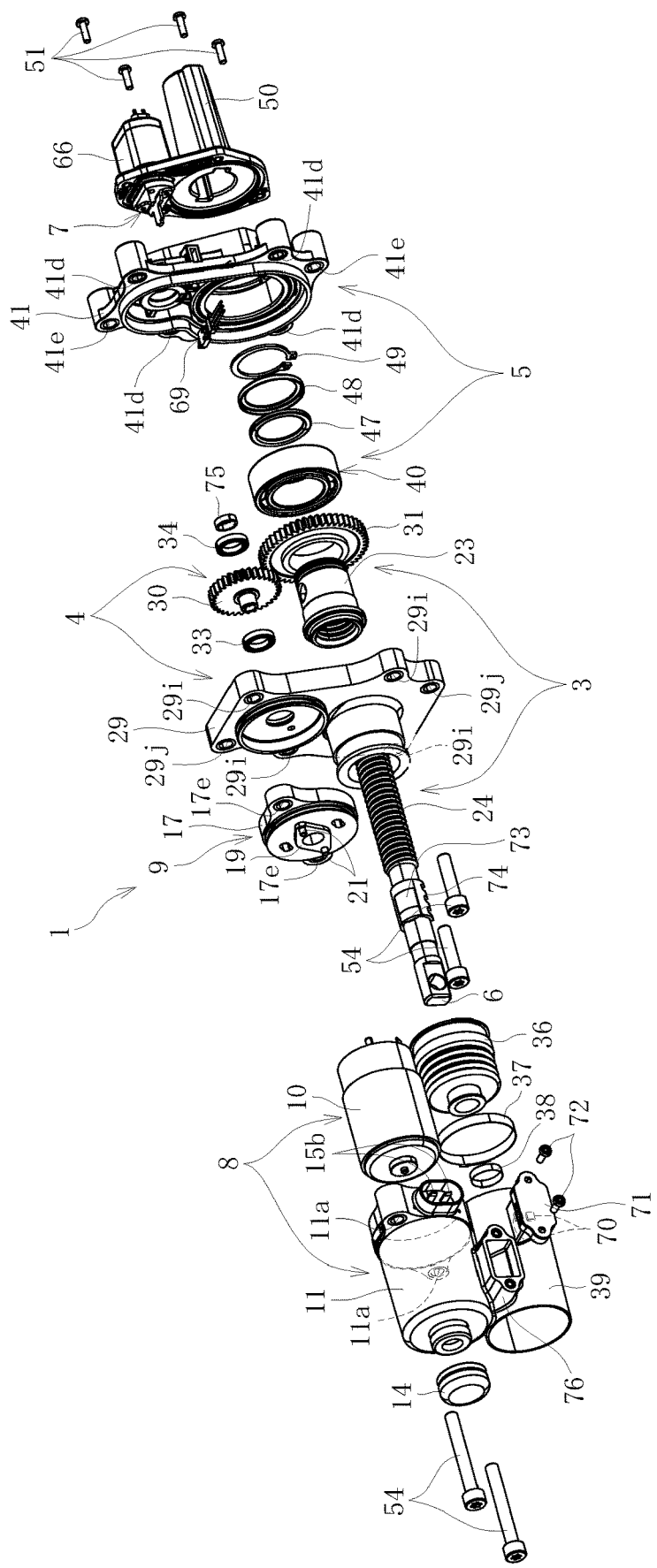
FIG. 3 is an exploded perspective view of the electric actuator.

FIG. 1 is a vertical sectional view for illustrating an assembled state of an electric actuator according to one embodiment of the present invention. FIG. 2 is an external perspective view for illustrating the assembled state of the electric actuator. FIG. 3 is an exploded perspective view of the electric actuator.

As illustrated in FIG. 1, an electric actuator 1 of this embodiment comprises a drive part 2, a motion conversion mechanism part 3, a driving force transmission part 4, a motion-conversion-mechanism support part 5, an operation part 6, and a lock mechanism part 7. The drive part 2 is configured to generate a driving force. The motion conversion mechanism part 3 is configured to convert a rotary motion from the driving part 2 into a linear motion. The driving force transmission part 4 is configured to transmit the driving force from the drive part 2 to the motion conversion mechanism part 3. The motion-conversion-mechanism support part 5 is configured to support the motion conversion mechanism part 3. The operation part 6 is configured to output the motion of the motion conversion mechanism part 3. The lock mechanism part 7 is configured to prevent the motion conversion mechanism part from driving. The drive part 2 comprises a motor part 8 and a speed reduction mechanism part 9.

Each of the parts forming the electric actuator 1 has a case. Component parts are accommodated in each of the cases. Specifically, the motor part 8 comprises a motor case 11 configured to accommodate a motor configured to generate a driving force (driving motor 10). The speed reduction mechanism part 9 comprises a speed reduction gear case 17 configured to accommodate a speed reduction gear mechanism 16. Moreover, the driving force transmission part 4 comprises a transmission gear case 29 configured to accommodate a transmission gear mechanism 28. The motion-conversion-mechanism support part 5 comprises a bearing case 41 configured to accommodate a support bearing 40. In this embodiment, respective pairs of the motor part 8 and the speed reduction mechanism part 9, the speed reduction mechanism part 9 and the driving force transmission part 4, and the driving force transmission part 4 and the motion-conversion-mechanism support part 5 are configured to be capable of being coupled to and decoupled from one another while the pairs are accommodated in the cases. Further, a shaft case 50 is configured to be capable of being coupled to and decoupled from the bearing case 41. Now, description is made of detailed configurations of the respective parts forming the electric actuator 1.

The motor part 8 mainly comprises the driving motor (for example, DC motor) 10 and the motor case 11. The driving motor 10 is configured to drive the motion conversion mechanism part 3. The motor case 11 is configured to accommodate the driving motor 10. The motor case 11 comprises a case main body 12 and a projecting portion 13. The case main body 12 has a bottomed cylindrical shape, and is configured to accommodate the driving motor 10 therein. The projecting portion 13 projects from a bottom portion 12a of the case main body 12 to the outside. The projecting portion 13 has a hole portion 13a which communicates to an internal space of the case main body 12. The hole portion 13a is sealed by a seal member 14 that is made of resin and covers an outer surface of the projecting portion 13.

The driving motor 10 is inserted from an opening portion 12d of the case main body 12 into an inside of the case main body 12. At this time, an end surface of the driving motor 10 on an inner side in an insertion direction is held in abutment against the bottom portion 12a of the case main body 12. Moreover, a fitting hole 12c is formed in a center portion of the bottom portion 12a. A projection 10b of the driving motor 10 in the inner side in the insertion direction is fitted to the fitting hole 12c, thereby being capable of preventing the situation in which a rear end (left end portion in FIG. 1) of an output shaft 10a of the driving motor 10 projecting from the projection 10b interferes with the bottom portion 12a of the motor case 11. Further, an inner peripheral surface of a peripheral wall portion 12b of the case main body 12 is reduced in diameter in a tapered shape from the opening portion 12d side toward the bottom portion 12a side. When the driving motor 10 is inserted into the case main body 12, an outer peripheral surface of the driving motor 10 on the inner side in the insertion direction comes into contact with the inner peripheral surface of the peripheral wall portion 12b. With this configuration, the driving motor 10 is supported through the contact with the inner peripheral surface of the case main body 12 and the fitting to the fitting hole 12c under the state in which the driving motor 10 is accommodated in the case main body 12.

Figure 4:
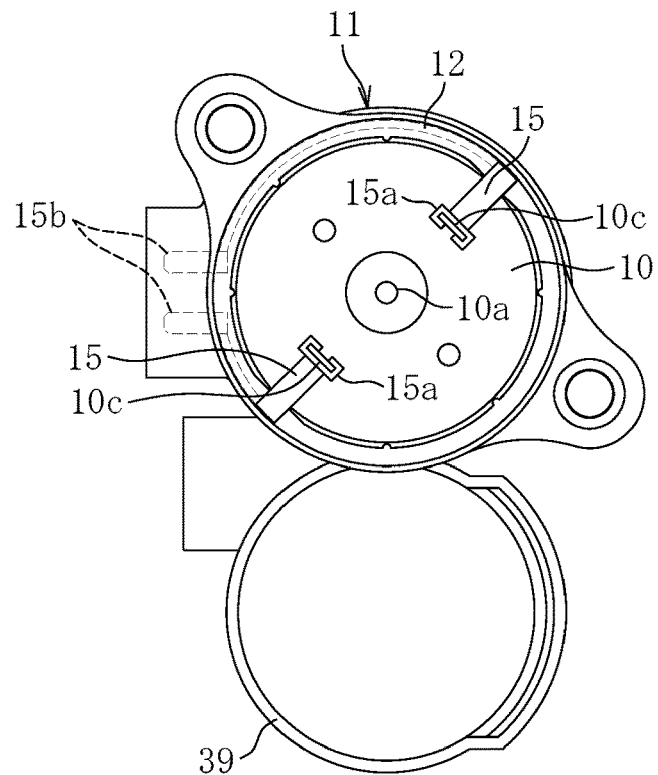
FIG. 4 is a view of a motor case as seen from an opening portion side.

Moreover, as illustrated in FIG. 4, which is a view of the motor case 11 as seen from the opening portion 12d side, a pair of bus bars 15 configured to connect the driving motor 10 to a power supply is mounted to the case main body 12. One end portion 15a of each of the bus bars 15 is connected to a motor terminal 10c through crimping, and another end portion 15b is exposed from the case main body 12 to the outside (see FIG. 2 and FIG. 3). The another end portions 15b of the bus bars 15 exposed to the outside are connected to the power supply.

As illustrated in FIG. 1, the speed reduction mechanism part 9 mainly comprises the speed reduction gear mechanism 16 and the speed reduction gear case 17. The speed reduction gear mechanism 16 is configured to reduce the speed of the driving force of the driving motor 10 and output the driving force. The speed reduction gear case 17 is configured to accommodate the speed reduction gear mechanism 16. The speed reduction gear mechanism 16 is formed of a planetary-gear speed reduction mechanism 18 comprising a plurality of gears and the like. A detailed configuration of the planetary-gear speed reduction mechanism 18 is described later.

The speed reduction gear case 17 has an accommodating recessed portion 17a configured to accommodate the planetary-gear speed reduction mechanism 18 from a side opposite to the driving motor 10 side. Moreover, the speed reduction gear case 17 is formed so as to enable a motor adaptor 19 serving as a motor mounting member to be mounted thereto. The motor adaptor 19 is a tubular member, and the driving motor 10 is fitted (internally fitted) to the motor adaptor 19 through insertion of a projection 10d of the driving motor 10 on an output side (right side in FIG. 1) into and fitted to an inner peripheral surface thereof. A fitting hole 17b to which the motor adaptor 19 is fitted is formed in the speed reduction gear case 17. The motor adaptor 19 is mounted to the speed reduction gear case 17 through insertion of the motor adaptor 19 from the driving motor 10 side into the fitting hole 17b.

The speed reduction gear case 17 is formed so as to be capable of being fitted to the motor case 11, and is also formed so as be capable of being fitted to a transmission gear case 29, descried later, and arranged on an opposite side of the motor case 11. A portion of the speed reduction gear case 17 arranged on the motor case 11 side is internally fitted to the opening portion 12d side of the motor case 11. A portion of the speed reduction gear case 17 arranged on the transmission gear case 29 side is externally fitted to the transmission gear case 29. Moreover, the speed reduction gear case 17 is fastened to the driving motor 10 through bolts 21 (see FIG. 3 and FIG. 6) together with the motor adaptor 19 while being fitted to the motor case 11. Recessed portions 17c are formed on the driving motor 10 side of the speed reduction gear case 17 in order to prevent interference of the motor terminals 10c projecting from the driving motor 10 and the end portions 15a of the bus bars 15 crimped to the motor terminals 10c with the speed reduction gear case 17 in a state in which the speed reduction gear case 17 and the motor case 11 are fitted to one another. Moreover, a mounting groove 17d configured to receive an O-ring 20 is formed on an outer peripheral surface, which has a small diameter, and to be fitted to an inner peripheral surface of the motor case 11, out of an outer peripheral surface of the speed reduction gear case 17.

In this embodiment, the motion conversion mechanism part 3 is formed of a ball screw 22. The ball screw 22 comprises a ball screw nut 23, a ball screw shaft 24, a large number of balls 25, and deflectors 26. The ball screw nut 23 serves as a rotary body. The ball screw shaft 24 serves as a movable part (namely, a stroke shaft) performing a linear motion. The deflectors 26 serve as circulation members. Spiral grooves 23a and 24a are respectively formed in an inner peripheral surface of the ball screw nut 23 and an outer peripheral surface of the ball screw shaft 24. The balls 25 are loaded between both of the spiral grooves 23a and 24a, and the deflectors 26 are assembled therebetween. With this configuration, the balls 25 in two rows circulate.

The ball screw nut 23 receives the driving force generated by the driving motor 10, to thereby rotate in a forward direction or a backward direction. Meanwhile, the rotation of the ball screw shaft 24 is restricted by a pin 27 that is provided on a rear end portion (right end portion in FIG. 1) thereof and serves as a rotation restriction member. Therefore, when the ball screw nut 23 rotates, the balls 25 circulate along both the spiral grooves 23a and 24a and the deflectors 26, and the ball screw shaft 24 performs the linear motion along the axial direction. FIG. 1 is a view for illustrating a state in which the ball screw shaft 24 is arranged at an initial position given when the ball screw shaft 24 retreats most to the right side of FIG. 1. Moreover, the ball screw shaft 24 is arranged in parallel with the output shaft 10a of the driving motor 10. The rotary motion transmitted from the driving motor 10 through intermediation of the driving force transmission part 4 is converted into a linear motion in the axial direction parallel to the output shaft 10a by the ball screw shaft 24. In this case, a distal end portion (left end portion in FIG. 1) of the ball screw shaft 24 in an advancing direction functions as the operation part (actuator head) 6 configured to operate an object device to be operated The driving force transmission part 4 mainly comprises the transmission gear mechanism 28 and the transmission gear case 29. The transmission gear mechanism 28 is configured to transmit the driving force and the rotary motion from the driving motor 10 of the drive part 2 to the ball screw 22 forming the motion conversion mechanism part 3. The transmission gear case 29 is configured to accommodate the transmission gear mechanism 28. The transmission gear mechanism 28 comprises a drive gear 30 on a drive side, a driven gear 31 on a driven side meshing with the drive gear 30, and a gear boss 32.

A gear boss 32 is fitted to a rotation center portion of the drive gear 30 by, for example, press-fitting. The drive gear 30 is rotatably supported through intermediation of the gear boss 32 by two rolling bearings 33 and 34 mounted respectively to both the transmission gear case 29 and the bearing case 41 described later. Meanwhile, the driven gear 31 is fixed to the outer peripheral surface of the ball screw nut 23 through fitting such as press-fitting. When the driving force is transmitted from the driving motor 10 to the drive gear 30 through the planetary-gear speed reduction mechanism 18, the driving force is transmitted to the driven gear 31 through meshing between the drive gear 30 and the driven gear 31. With this, the driven gear 31 and the ball screw nut 23 integrally rotate, and the ball screw shaft 24 advances and retreats along a longitudinal direction thereof.

The transmission gear case 29 comprises an accommodating recessed portion 29a configured to accommodate the drive gear 30 and the driven gear 31 therein. Moreover, the transmission gear case 29 has an insertion hole 29b through which the gear boss 32 is inserted. On an inner peripheral surface of the insertion hole 29b, there is formed a bearing mounting surface 29c to which the one rolling bearing 33 configured to support the gear boss 32 is mounted. Moreover, the transmission gear case 29 comprises an annular projection 29d fitted to an inner peripheral surface of the speed reduction gear case 17. In an outer peripheral surface (fitting surface) of the annular projection 29d, there is formed a mounting groove 29e configured to mount an O ring 35. Moreover, in a surface of the transmission gear case 29 on the bearing case 41 side, there is formed a fitting recessed portion 29f in a groove form fitted to the bearing case 41.

Moreover, the transmission gear case 29 comprises a cylindrical portion 29g projecting toward a distal end portion side (left side in FIG. 1) of the ball screw shaft 24. The cylindrical portion 29g is a portion arranged so as to cover a periphery of the ball screw shaft 24 under a state in which the driven gear 31 is accommodated in the transmission gear case 29, and the ball screw 22 is assembled to the driven gear 31. A boot 36 configured to prevent foreign substances from entering the transmission gear case 29 is mounted between the cylindrical portion 29g and the ball screw shaft 24. The boot 36 is made of resin or rubber, and comprises a large-diameter end portion 36a, a small-diameter end portion 36b, and a bellows portion 36c, which connects the large-diameter end portion 36a and the small-diameter end portion 36b with one another, and extends or retreats in the axial direction. The large-diameter end portion 36a is fixed to a mounting portion of an outer peripheral surface of the cylindrical portion 29g by tightening a boot band 37. The small-diameter end portion 36b is fixed to a mounting portion of the outer peripheral surface of the ball screw shaft 24 by tightening a boot band 38. Moreover, the cylindrical portion 29g has a vent hole 29h which is configured to cause the air to communicate between an inside and an outside of the boot 36 when the boot 36 expands and contracts. Moreover, a boot cover 39 arranged around the boot 36 is provided integrally with the motor case 11.

The motion-conversion-mechanism support part 5 mainly comprises the support bearing 40 and the bearing case 41. The support bearing 40 is configured to support the ball screw 22 being the motion conversion mechanism part 3. The bearing case 41 is configured to accommodate the support bearing 40. In this embodiment, the support bearing 40 is formed of a back-to-back double-row angular contact ball bearing comprising an outer ring 42, an inner ring 43, and balls 44 in a plurality of rows interposed therebetween as main components.

The support bearing 40 is accommodated in a sleeve 45 formed integrally with the bearing case 41, and is fixed through a snap ring 46 mounted to an inner peripheral surface of the sleeve 45. Moreover, the support bearing 40 is fixed by being press-fitted to an outer peripheral surface of the ball screw nut 23 at a position on a rear end side (right side in FIG. 1) of the ball screw shaft 24 with respect to the driven gear 31. A movement in the axial direction of the support bearing 40 and the driven gear 31 fixed to the outer peripheral surface of the ball screw nut 23 is restricted by a restriction projection 23b formed on the ball screw nut 23 on the driven gear 31 side and a restriction member 47 mounted on the support bearing 40 side. The restriction member 47 comprises a pair of semicircular members, and is mounted to the outer peripheral surface of the ball screw nut 23 while the semicircular members are combined in an annular form. Further, a pressing collar 48 and a snap ring 49 are mounted to the outer peripheral surface of the ball screw nut 23. The pressing collar 48 is configured to hold the restriction member 47. The snap ring 49 is configured to prevent the pressing collar 48 from falling off in the axial direction.

On the transmission gear case 29 side of the bearing case 41, there is formed a protruding portion 41a configured to be fitted to the fitting recessed portion 29f of the transmission gear case 29. Moreover, on the transmission gear case 29 side of the bearing case 41, there is formed a gear boss accommodating portion 41b configured to accommodate a part of the gear boss 32 projecting from the transmission gear case 29 under a state in which the bearing case 41 is fitted to the transmission gear case 29. On an inner peripheral surface of the gear boss accommodating portion 41b, there is formed a bearing mounting surface 41c which is configured to mount the rolling bearing 34 configured to support the gear boss 32.

On an opposite side of the bearing case 41 with respect to the transmission gear case 29 side, the shaft case 50 having a bottomed tubular shape configured to accommodate a rear end portion side (right end portion side in FIG. 1) of the ball screw shaft 24 is formed so as to be capable of being fastened through bolts 51 (see FIG. 3). In an abutment surface of the shaft case 50 against the bearing case 41, there is formed a mounting groove 50a configured to mount an O ring 52. Moreover, in an inner peripheral surface of the shaft case 50, guide grooves 50b into which both end portions of the pin 27 provided on the ball screw shaft 24 are formed so as to extend in the axial direction. A guide collar 53 is rotatably mounted to each of the both end portions of the pin 27. When the ball screw shaft 24 advances and retreats in the axial direction, the guide collars 53 move along the guide grooves 50b while rotating.

As illustrated in FIG. 3, bolt insertion holes 11a, 17e, 29i, and 41d for inserting bolts 54 configured to assemble and fasten the motor case 11, the speed reduction gear case 17, the transmission gear case 29, and the bearing case 41 are formed in outer peripheries of the respective cases in a radial direction. Further, through holes 29j and 41e configured to mount the assembled electric actuator 1 to an installation location are formed in the outer peripheries in the radial direction of both of the transmission gear case 29 and the bearing case 41.

Figure 5:
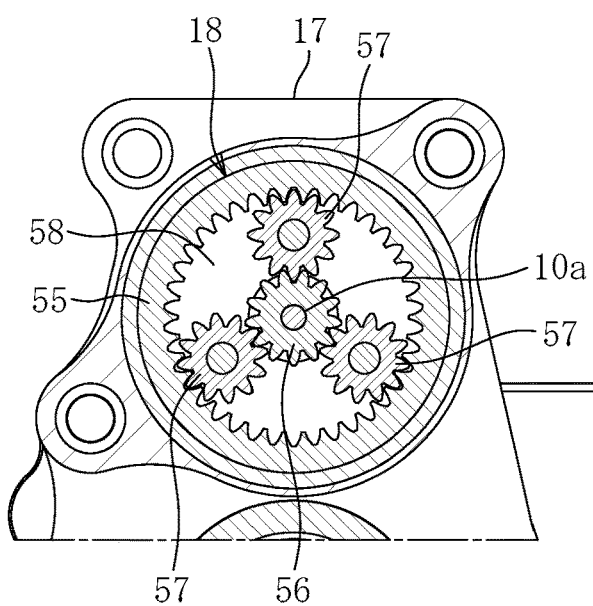
FIG. 5 is a transverse sectional view taken along the line A-A in FIG. 1 and seen from a direction indicated by the arrows A.
Figure 6:
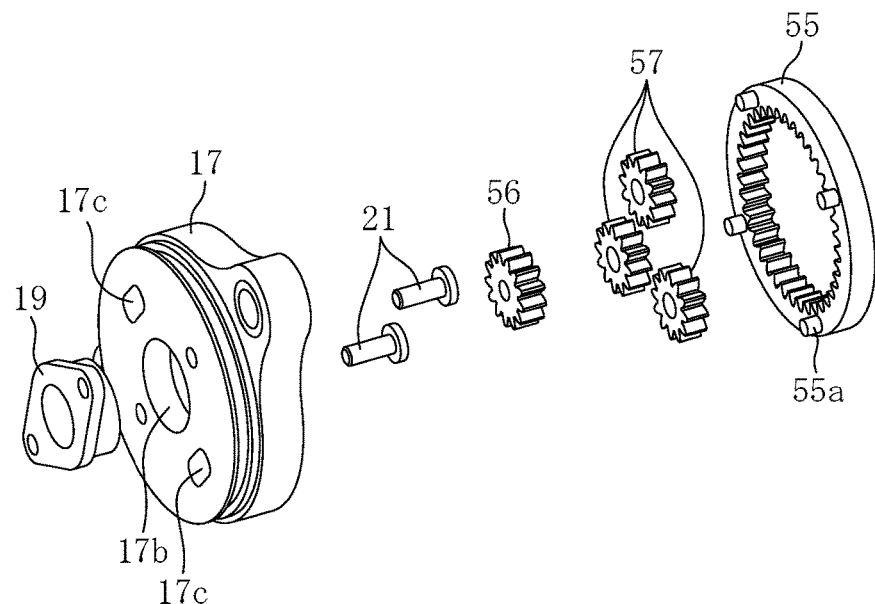
FIG. 6 is an exploded perspective view of a speed reduction mechanism part.

Now, description is made of the planetary-gear speed reduction mechanism 18 with reference to FIG. 1, FIG. 5, and FIG. 6. FIG. 5 is a transverse sectional view taken along the line A-A in FIG. 1 and seen from a direction indicated by the arrows A. FIG. 6 is an exploded perspective view of the planetary-gear speed reduction mechanism 18.

The planetary-gear speed reduction mechanism 18 comprises a ring gear 55, a sun gear 56, a plurality of planetary gears 57, a planetary gear carrier 58 (see FIG. 1), and planetary gear holders 59 (see FIG. 1). The ring gear 55 comprises a plurality of protrusions 55a projecting in the axial direction. Engagement recessed portions 17f as many as the protrusions 55a are formed in the accommodating recessed portion 17a of the speed reduction gear case 17 (see FIG. 1). Through assembly of the protrusions 55a of the ring gear 55 to the engagement recessed portions 17f of the speed reduction gear case 17 in a state in which the protrusions 55a and the engagement recessed portions 17f are in phase, the ring gear 55 is accommodated in the speed reduction gear case 17 while the rotation of the ring gear 55 is stopped.

The sun gear 56 is arranged at the center of the ring gear 55. The output shaft 10a of the driving motor 10 is press-fitted to the sun gear 56. Moreover, the respective planetary gears 57 are arranged between the ring gear 55 and the sun gear 56 so as to mesh with the ring gear 55 and the sun gear 56. The respective planetary gears 57 are rotatably supported by the planetary gear carrier 58 and the planetary gear holders 59. The planetary gear carrier 58 comprises a cylindrical portion 58a at its center portion. The cylindrical portion 58a is press-fitted between an outer peripheral surface of the gear boss 32 and an inner peripheral surface of the rolling bearing 33 as described above (see FIG. 1). An annular collar 75 is mounted between an inner peripheral surface of the another rolling bearing 34 and the outer peripheral surface of the gear boss 32.

In the planetary-gear speed reduction mechanism 18 having the configuration described above, when the driving motor 10 performs the rotational drive, the sun gear 56 coupled to the output shaft 10a of the driving motor 10 rotates, and, along with this rotation, the respective planetary gears 57 revolve along the ring gear 55 while rotating. With this, the rotary motion of the driving motor 10 is transmitted to the drive gear 30 while the speed of the rotary motion is reduced, and a rotation torque serving as the driving force is transmitted to the drive gear 30 in a state in which the rotation torque is increased. The large driving force transmitted to the ball screw shaft 24 as well as a high output of the ball screw shaft 24 are thus obtained through the transmission of the driving force through the planetary-gear speed reduction mechanism 18 in such a manner, and the downsizing of the driving motor 10 can thus be achieved.

Figure 7:
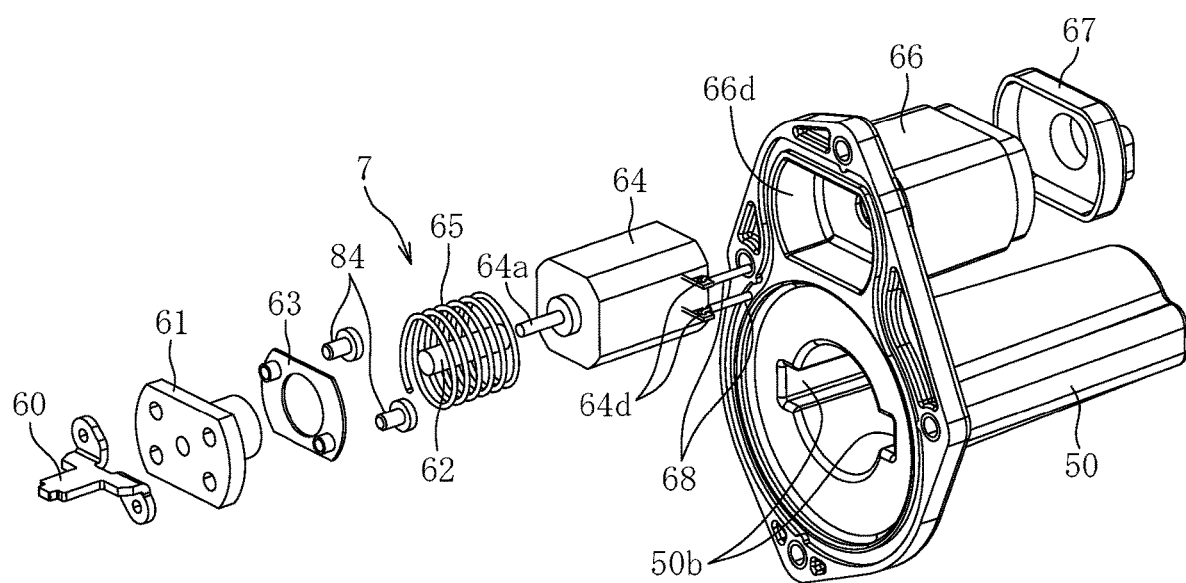
FIG. 7 is an exploded perspective view of a shaft case and a lock mechanism part mounted thereto.
Figure 8:
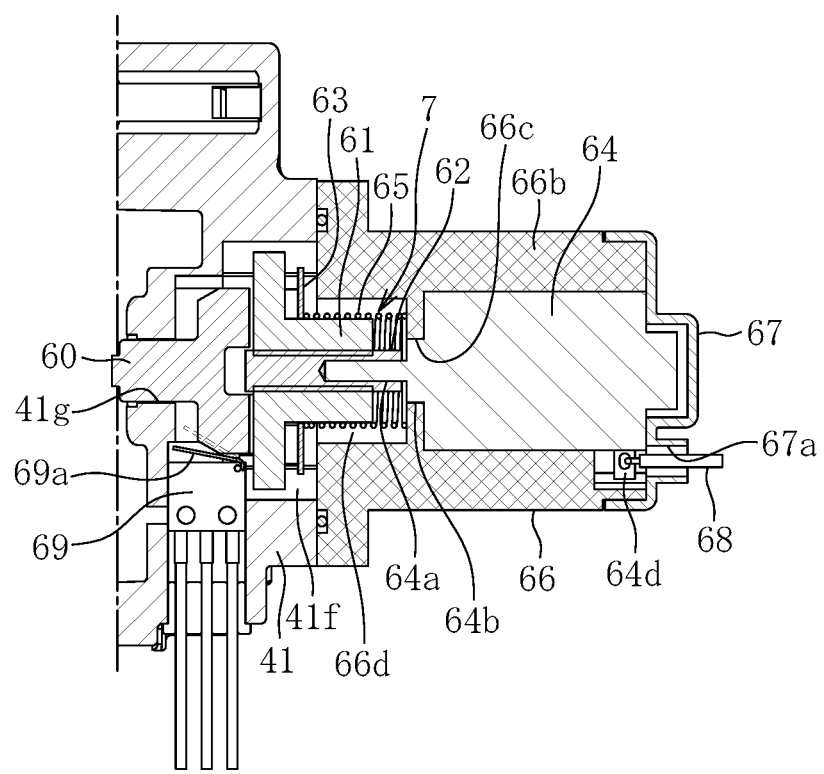
FIG. 8 is a transverse sectional view taken along the line B-B in FIG. 1 and seen from a direction indicated by the arrows B.

Next, detailed description is made of the lock mechanism part 7 with reference to FIG. 1, FIG. 7, and FIG. 8. FIG. 7 is an exploded perspective view of the shaft case 50 and the lock mechanism part 7 mounted thereto. FIG. 8 is a transverse sectional view taken along the line B-B in FIG. 1 and seen from a direction indicated by the arrows B.

The lock mechanism part 7 mainly comprises a lock member 60, a sliding screw nut 61, a sliding screw shaft 62, a lock-member fixation plate 63, a locking motor (for example, DC motor) 64 serving as a locking drive source, and a spring 65. The lock mechanism part 7 is to be assembled, for example, in the following procedure. First, the lock member 60 is fastened to the sliding screw nut 61 through intermediation of the lock-member fixation plate 63 with bolts 84 (see FIG. 7). Next, the locking motor 64 is accommodated in a holder portion 66 formed in the shaft case 50. The sliding screw shaft 62 is then mounted to an output shaft 64a of the locking motor 64 projecting from the holder portion 66. Then, the spring 65 is arranged on an outer periphery of the sliding screw shaft 62, and the sliding screw nut 61 having the lock member 60 mounted thereto is mounted to the sliding screw shaft 62 through thread engagement. In such a manner, the assembly of the lock mechanism part 7 is completed.

The holder portion 66 is formed into a bottomed tubular shape, and a cap 67 is mounted on an opposite side of a bottom portion 66a thereof. The locking motor 64 is held in abutment against the bottom portion 66a of the holder portion 66 and an inner surface of the cap 67 under a state in which the locking motor 64 is inserted into the holder portion 66 and the cap 67 is mounted. Moreover, under this state, a projection 64b of the locking motor 64 on an output side (left side in FIG. 1) is fitted to a fitting hole 66c formed in the bottom portion 66a of the holder portion 66. Both of an outer peripheral surface of the main body of the locking motor 64 and an inner peripheral surface of a peripheral wall portion 66*b* of the holder portion 66 are formed into the same shapes, which are not cylindrical. Thus, the rotation of the locking motor 64 is restricted through the insertion of the locking motor 64 into the peripheral wall portion 66*b* of the holder portion 66. Through accommodation of the locking motor 64 in the holder portion 66 in such a manner, the locking motor 64 is held by the holder portion 66, and the entire lock mechanism part 7 is held. Moreover, the cap 67 has a hole portion 67*a* configured to insert cables 68 connected to motor terminals 64*d* of the locking motor 64 (see FIG. 8). In this embodiment, the holder portion 66 is integrally formed in the shaft case 50 as a part thereof. However, as a matter of course, the holder portion 66 may be formed independently of the shaft case 50, and may be mounted to the bearing case 41.

Lock-mechanism accommodating recessed portions 66*d* and 41*f* are respectively formed in a portion of the shaft case 50 at which the holder portion 66 is formed and a portion of the bearing case 41 opposed thereto. A through hole 41*g* is formed in the lock-mechanism accommodating recessed portion 41*f* on the bearing case 41 side. As illustrated in FIG. 1, a part of the output shaft 64*a* of the locking motor 64, the sliding screw shaft 62, the sliding screw nut 61, the lock-member fixation plate 63, the spring 65, and the lock member 60, which project from the holder portion 66, are accommodated in the lock-mechanism accommodating recessed portions 66*d* and 41*f*, and a distal end portion side of the lock member 60 is inserted into the through hole 41*g* under a state in which the shaft case 50 is mounted to the bearing case 41. Moreover, the spring 65 is compressed in the axial direction between the bottom portion 66*a* of the holder portion 66 and the lock-member fixation plate 63 under the state in which the shaft case 50 is mounted to the bearing case 41. The lock member 60 is always urged in an advancing direction (left side in FIG. 1) by the compressed spring 65.

Figure 9:
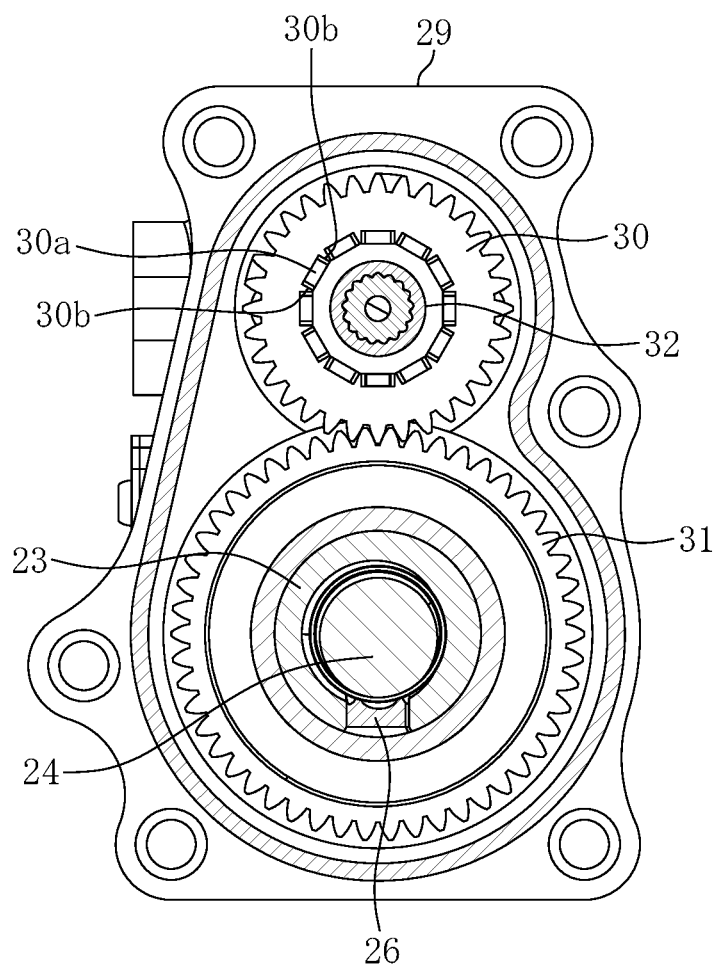
FIG. 9 is a transverse sectional view taken along the line C-C in FIG. 1 and seen from a direction indicated by the arrows C.

The drive gear 30 is arranged in the advancing direction of the lock member 60. The drive gear 30 has engagement holes 30*a* with which the distal end portion of the lock member 60 can be engaged. As illustrated in FIG. 9, which is a transverse sectional view taken along the line C-C in FIG. 1 and seen from a direction indicated by the arrows C, the engagement holes 30*a* are formed at a plurality of locations in a circumferential direction of the drive gear 30. The rotation of the drive gear 30 is restricted through the engagement of the lock member 60 with any one of these engagement holes 30*a*. Moreover, tilted surfaces 30*b* may be formed at an entrance portion of each of the engagement holes 30*a* (see FIG. 9). Through formation of the engagement holes 30*a* in such a manner, such an effect that the lock member 60 is smoothly inserted into the engagement hole 30*a* along the tilted surfaces 30*b* is expected.

A lock sensor 69 configured to detect a locking state is mounted to the bearing case 41 (see FIG. 8). The lock sensor 69 is a contact sensor comprising a contact element 69*a* formed of an elastic member such as a plate spring. When the lock member 60 advances to be engaged with the engagement hole 30*a* (brought into a locking state), the lock member 60 pushes the contact element 69*a* so that the lock sensor 69 detects the locking state.

The lock mechanism part 7 having the configuration described above performs, for example, an operation described below. Specifically, when power is not supplied to the locking motor 64, the lock member 60 is held at the advanced position by the spring 65, and is in the locking state in which the distal end portion of the lock member 60 is engaged with the engagement hole 30*a* of the drive gear 30. When the power is supplied to the driving motor 10 in order to start the driving of the ball screw shaft 24 in this state, the power is also supplied to the locking motor 64, and the locking motor 64 drives the lock member 60 in a retreating direction. With this, the sliding screw shaft 62 rotates. Meanwhile, the rotation of the sliding screw nut 61 is restricted through the insertion of the flat-plate-shaped distal end portion of the lock member 60 into the through hole 41*g*. Thus, when the sliding screw shaft 62 rotates, the sliding screw nut 61 retreats against the urging force of the spring 65, and the lock member 60 retreats integrally with the sliding screw nut 61. With this, the distal end portion of the lock member 60 is disengaged from the engagement hole 30*a* of the drive gear 30, and the locking state is thus released. In this way, while the ball screw shaft 24 is being driven, the lock member 60 is held at the retreated position, and the drive gear 30 is thus held in the unlocked state.

After that, when the supply of power to the driving motor 10 is shut off and the drive of the ball screw shaft 24 is thus stopped, the supply of power to the locking motor 64 is also shut off. With this, the driving force for causing the lock member 60 to retreat is no longer generated, and the lock member 60 is thus pushed to move in the advancing direction by the spring 65. Then, the locking state is brought about through the engagement of the distal end portion of the lock member 60 with the engagement hole 30*a* of the drive gear 30, thereby restricting the rotation of the drive gear 30.

Through restriction of the rotation of the drive gear 30 by the lock member 60 in such a manner, the ball screw shaft 24 is held in the state in which the ball screw shaft 24 does not retreat. With this, even when an external force is input from the object device to be operated to the ball screw shaft 24 side, a position of the ball screw shaft 24 can be held at a predetermined position. This configuration is particularly preferred for a case in which the electric actuator is applied to an application that requires holding a position of the ball screw shaft 24.

In this embodiment, the lock member 60 is caused to retreat by driving the locking motor 64. Conversely, the locking motor 64 may be driven to cause the lock member 60 to advance. Moreover, the lock member 60 may be caused to advance and retreat by rotating the locking motor 64 forward and backward.

A position detection device configured to detect a position of the operation part 6 provided on the ball screw shaft 24 in a stroke direction is mounted to the electric actuator 1. In the position detection device, a permanent magnet 73 (see FIG. 1) serving as a sensor target is provided on the ball screw shaft 24, and magnetic sensors 70 serving as non-contact sensors configured to detect the position of the permanent magnet 73 in the stroke direction are arranged on the boot cover 39 covering the boot 36 (see FIG. 2 and FIG. 3).

Figure 10:
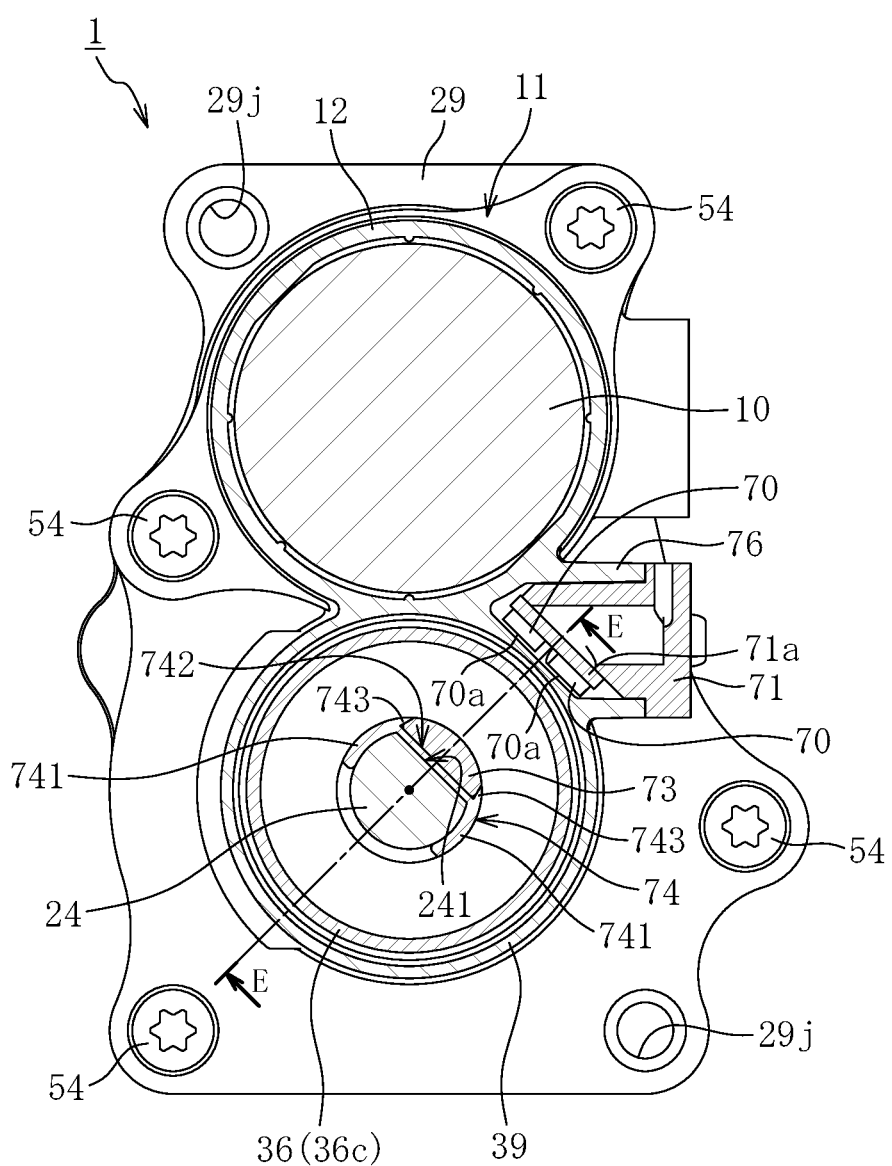
FIG. 10 is a transverse sectional view taken along the line D-D in FIG. 1 and seen from a direction indicated by the arrows D.

The magnetic sensors 70 are provided on the boot cover 39 formed integrally with the motor case 11. Specifically, as illustrated in FIG. 10, a sensor case 76 opening toward the outside of the motor case 11 is formed in a vicinity of a coupling portion between a portion (case main body 12) of the motor case 11 configured to receive the driving motor 10 and the boot cover 39. Then, a sensor base 71 to which the two magnetic sensors 70 are mounted is fixed to the sensor case 76 by fastening bolts 72 (see FIG. 3). With this, the magnetic sensors 70 are brought into a state in which the magnetic sensors 70 are opposed to the permanent magnet 73 through the boot cover 39. In an exact sense, the magnetic sensors 70 are arranged on a radially outer side of the ball screw shaft 24 so that detection surfaces 70a of the magnetic sensors 70 face the permanent magnet 73 as seen in a direction illustrated in FIG. 10. In this case, the magnetic sensors 70 are in a state in which the magnetic sensors 70 are covered with the boot cover 39, the sensor case 76, and the sensor base 71.

Figure 11:
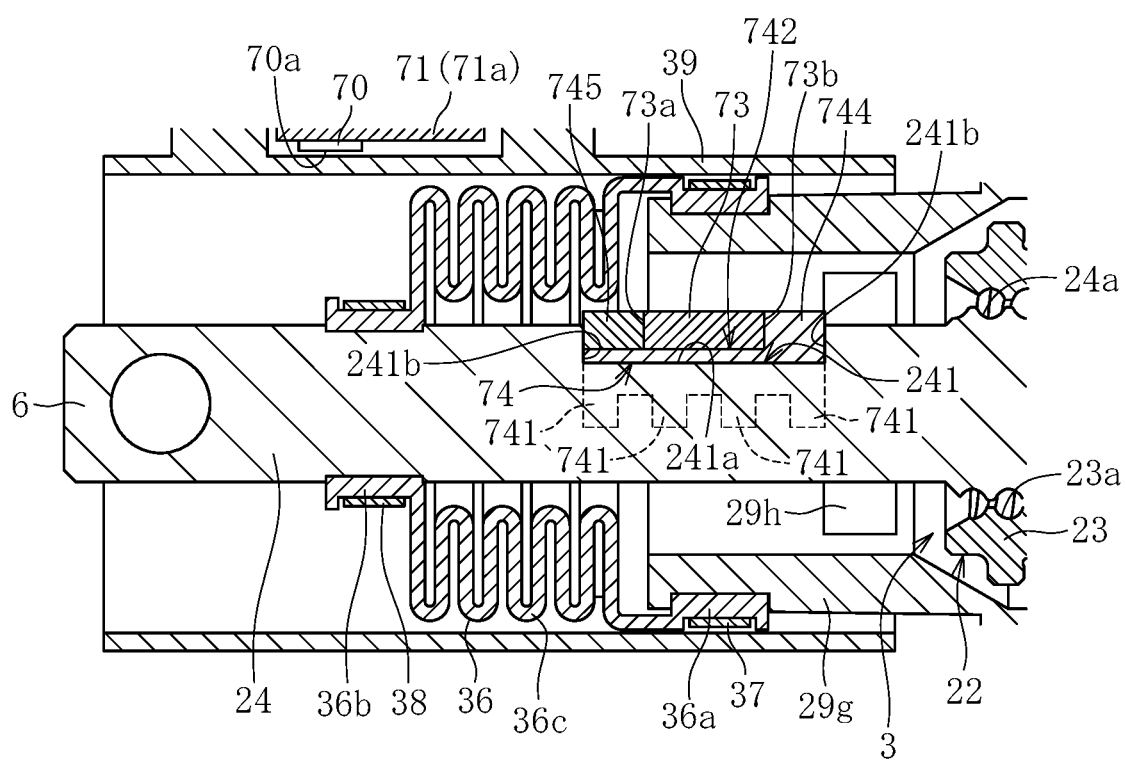
FIG. 11 is a sectional view taken along the line E-E in FIG. 10 and seen from a direction indicated by the arrows E.
Figure 15:
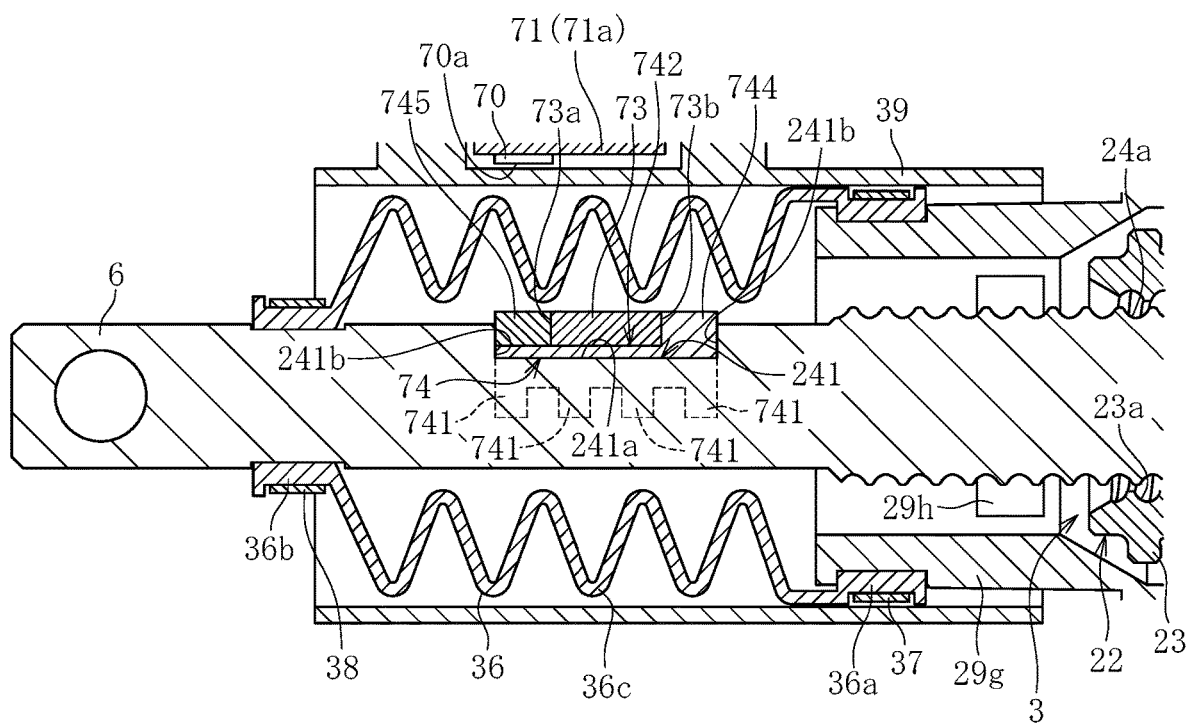
FIG. 15 is a sectional view of FIG. 11 in a state in which the ball screw shaft has advanced.

Moreover, the magnetic sensors 70 are arranged at an intermediate position of the boot cover 39 in the axial direction (stroke direction) (see FIG. 11). On this occasion, in terms of a positional relationship with the permanent magnet 73, it is preferred that the magnetic sensors 70 be arranged within a stroke range (see FIG. 11 and FIG. 15) of the permanent magnet 73 mounted to the ball screw shaft 24.

A magnetic sensor of any suitable type can be used as the magnetic sensor 70. Among those, a magnetic sensor such as a Hall IC and a linear Hall IC of a type that uses the Hall effect to detect a direction and a magnitude of a magnetic field can be suitably used.

Moreover, it is preferred that all of the sensor base 71 (particularly the base plate 71a of the sensor base 71 in contact with the magnetic sensors 70), the sensor case 76, and the boot cover 39, which cover a periphery of the magnetic sensors 70, be formed of a nonmagnetic material. For example, those components are formed of resin.

Meanwhile, the permanent magnet 73 serving as the sensor target is arranged in the ball screw shaft 24 serving as the movable part. In detail, as illustrated in FIG. 1, the permanent magnet 73 is arranged between the operation part 6 and the spiral groove 24a out of the ball screw shaft 24.

Moreover, in terms of a position relationship with the magnetic sensors 70, as illustrated in FIG. 11, the permanent magnet 73 is arranged in a portion covered with the boot 36 out of the outer peripheral surface of the ball screw shaft 24. As a result, the boot 36 is always present between the magnetic sensors 70 and the permanent magnet 73. As a matter of course, the arrangement form of the non-contact sensors (magnetic sensors 70) and the sensor target (permanent magnet 73) in the present invention is not limited to this. When it is possible, the sensor target may be arranged on a side closer to the operation part 6 with respect to the portion of mounting the boot 36 out of the ball screw shaft 24.

Figure 12:
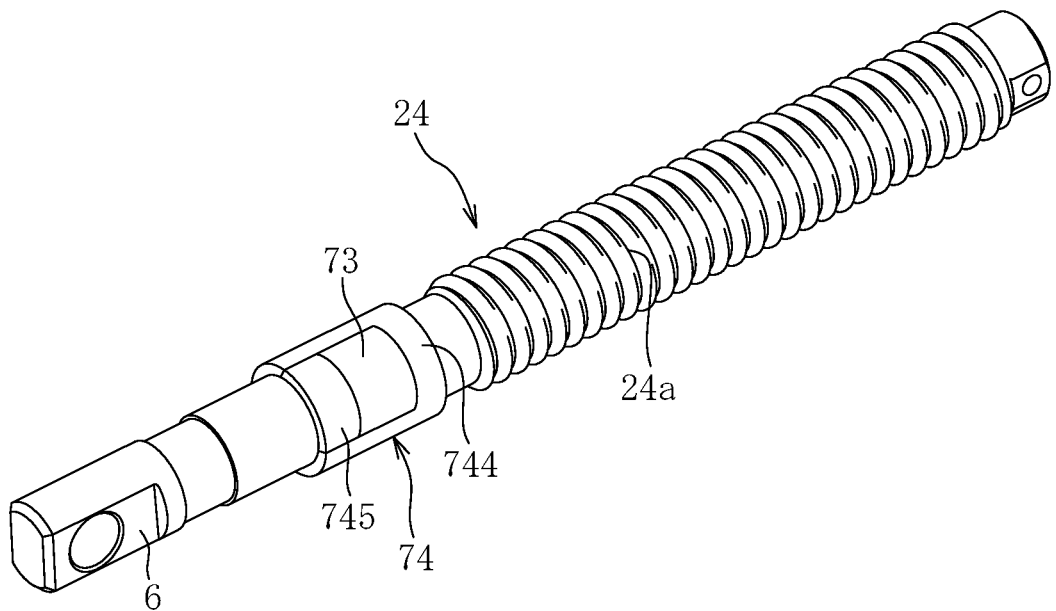
FIG. 12 is a perspective view for illustrating a ball screw shaft in a state in which a magnet is mounted.
Figure 13:
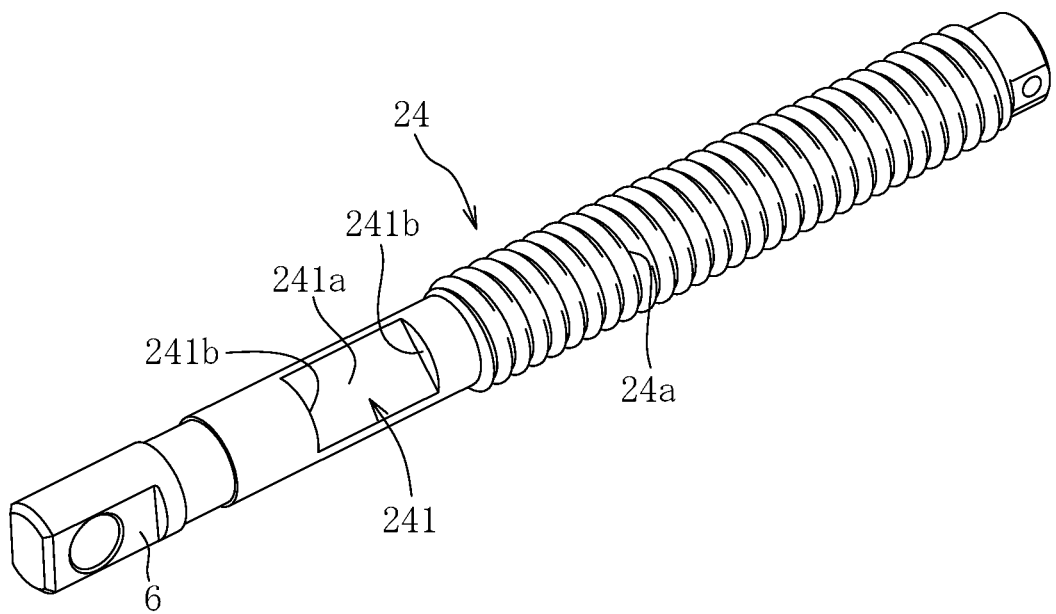
FIG. 13 is a perspective view for illustrating the ball screw shaft.

FIG. 12 is perspective view for illustrating the ball screw shaft 24 (ball screw shaft unit) in a state in which the sensor target including the permanent magnet 73 is mounted to a predetermined position in the axial direction. Moreover, FIG. 13 is a perspective view for illustrating the ball screw shaft 24 as a single unit. As illustrated in FIG. 12 and FIG. 13, a cutout portion 241 is formed at a predetermined position of the ball screw shaft 24 in the axial direction. The sensor target is mounted to the cutout portion 241. A shape of the cutout portion 241 is appropriately set in accordance with a shape of the magnet holder 74, which is an object to be mounted. In the illustrated example, the cutout portion 241 comprises a flat surface 241a and a pair of axial end surfaces 241b. The flat surface 241a is obtained by cutting the ball screw shaft 24 at an imaginary plane passing a position displaced from the center of the ball screw shaft 24 in the radial direction. The pair of axial end surfaces 241b are positioned on both sides of the flat surface 241a in the axial direction, and have a shape of rising from the flat surface 241a in the radial direction of the ball screw shaft 24.

Figure 14A:
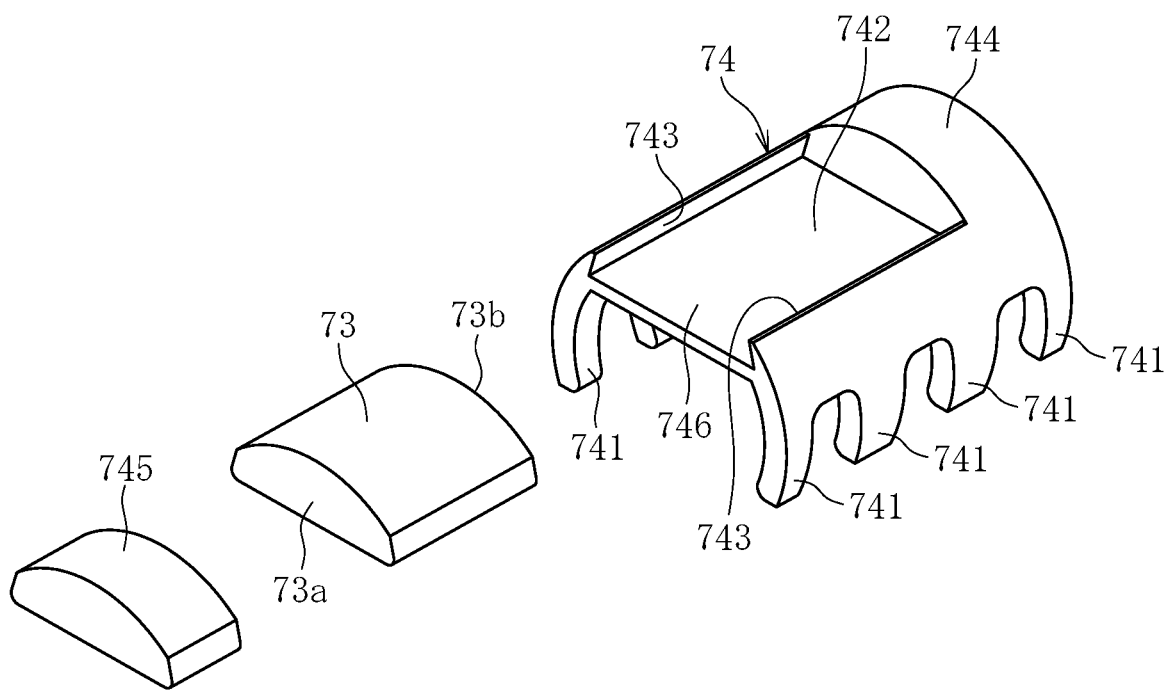
FIG. 14A is a perspective view for illustrating a sensor target comprising a magnet and a magnet holder.
Figure 14B:
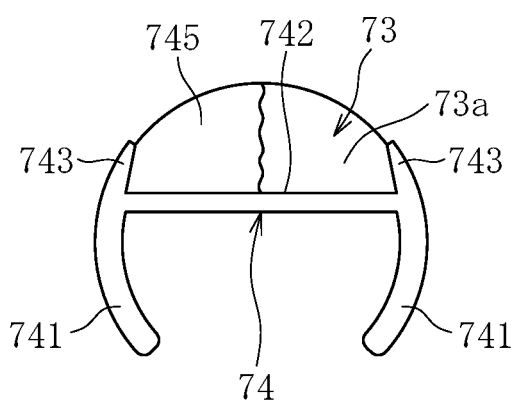
FIG. 14B is a front view for illustrating the sensor target comprising the magnet and the magnet holder.

FIG. 14A and FIG. 14B are a perspective view and a front view, respectively, for illustrating the sensor target comprising the permanent magnet 73. As illustrated in FIG. 14A and FIG. 14B, the sensor target comprises the permanent magnet 73 and the magnet holder 74 configured to hold the permanent magnet 73. A pair of or a plurality of pairs (four pairs in the illustrated example) of fitting claws 741 that can fit to the outer peripheral surface of the ball screw shaft 24, which is the cutout portion 241 in this embodiment, are formed in the magnet holder 74. Moreover, a fitting recessed portion 742 to which the permanent magnet 73 can be fitted is provided on an opposite side of a protruding side of the fitting claws 741.

The fitting claws 741 form a shape following the outer peripheral surface of the ball screw shaft 24, which is an object of mounting (see FIG. 10 and FIG. 14B). For example, through pressing the magnetic holder 74 from the cutout portion 241 side, the fitting claws 741 of each of the pairs are configured to deform toward directions toward which the fitting claws 741 separate from one another, and recover to original positions in a state in which the magnetic holder 74 is in contact with the flat surface 241a of the cutout portion 241.

The fitting recessed portion 742 comprises a pair of side wall portions 743, a first sandwiching portion 744, and a second sandwiching portion 745. The first sandwiching portion 744 is formed integrally with the pair of the side wall portions 743. The second sandwiching portion 745 is formed independently of the pair of the side wall portions 743 and the first sandwiching portion 744, and is capable of sandwiching the permanent magnet 73 between the second sandwiching portion 745 and the first sandwiching portion 744. In this case, only one side in the axial direction out of four sides of an approximately rectangular shape surrounding the fitting recessed portion 742 is opened. The permanent magnet 73 and the second sandwiching portion 745 can be inserted toward the fitting recessed portion 742 from an opening portion 746 side (see FIG. 14).

Moreover, the pair of the side wall portions 743 have such shapes that approach one another toward distal end sides (see FIG. 14B). With this, a movement of the permanent magnet 73 toward the radially outer side (top side in FIG. 14B) fitted to the fitting recessed portion 742 is restricted.

The magnet holder 74 of the above-mentioned configuration is basically made of any suitable material as long as the magnet holder 74 can be fitted to the ball screw shaft 24 while the one or the plurality of pairs of fitting claws 741 elastically deform. However, for example, in consideration of influence on the magnetic field formed by the permanent magnet 73 therearound, it is preferred that the magnet holder 74 be formed of a nonmagnetic material. When the elastic deformation property of the fitting claws 741 is considered together, it is preferred that the magnet holder 74 be made of resin.

Moreover, a magnetization direction of the permanent magnet 73 is a direction orthogonal to both of end surfaces 73a and 73b. In other words, the permanent magnet 73 is magnetized so that the one end surface 73a forms the N pole and the another end surface 73b forms the S pole. With this, the magnetization direction of the permanent magnet 73 in the state in which the permanent magnet 73 is mounted to the ball screw shaft 24 matches the liner motion direction of the ball screw shaft 24 (see FIG. 11).

There is no particular requirement as to the shape of the permanent magnet 73. However, in consideration of such facts that, as in this embodiment, the permanent magnet 73 travels in a limited space (inner space of the boot cover 39 or the cylindrical portion 29g of the transmission gear case 29), and the boot 36 is arranged in this space so as to freely extend and contract, it is desired that the permanent magnet 73 have such a shape (see FIG. 10) that protrusion of the permanent magnet 73 from the ball screw shaft 24 is as small as possible under a state in which the permanent magnet 73 is mounted to the ball screw shaft 24. As an example of such a shape, a shape as illustrated in, for example, FIG. 14A can be given. Specifically, a portion of an outer surface of the permanent magnet 73, which is exposed under a state in which the permanent magnet 73 is held by the magnet holder 74, has a shape of a surface of a partial cylinder.

In the position detection device having the configuration described above, when the ball screw shat 24 advances or retreats, a position of the permanent magnet 73 with respect to the magnetic sensors 70 changes (see FIG. 11 and FIG. 15), and a magnetic field at the arrangement locations of the magnetic sensors 70 also changes along with such change. Thus, a direction and a position of a stroke of the permanent magnet 73 as well as a direction and a position of a stroke of the operation part 6 provided on one end side of the ball screw shaft 24 can be acquired through the magnetic sensors 70 detecting the change in the magnetic field (for example, a direction and a strength of magnetic flux).

Figure 16:
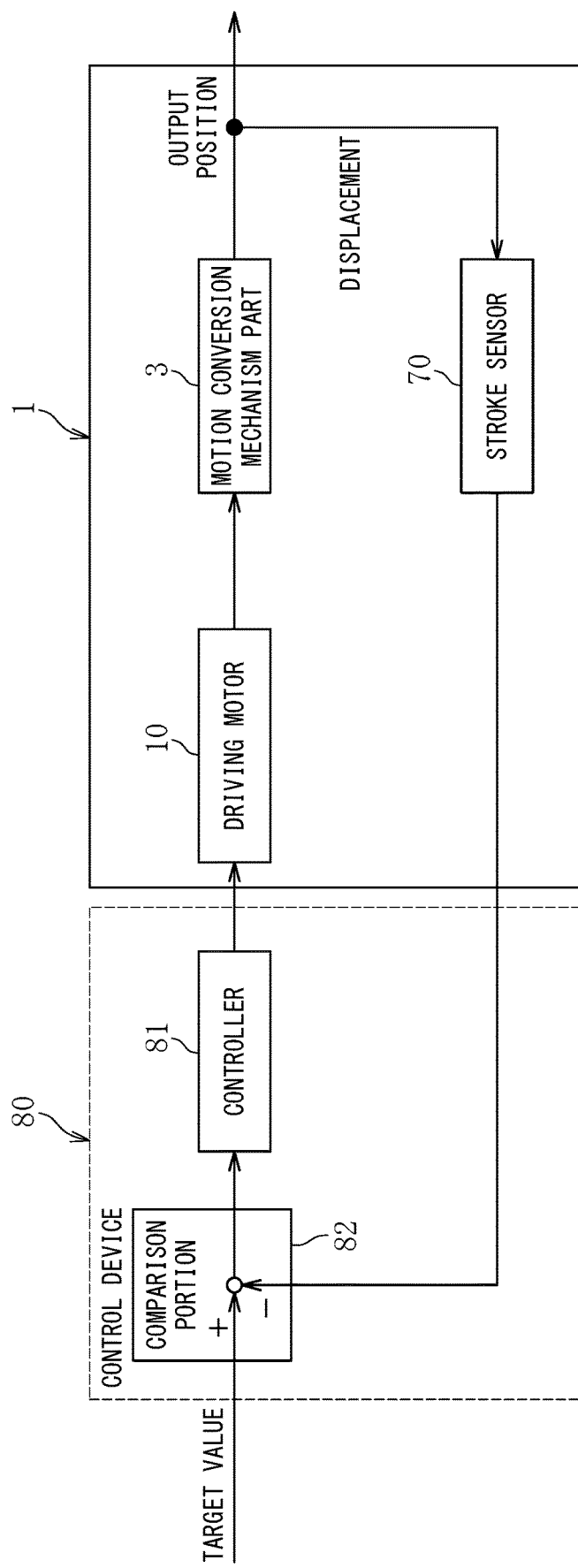
FIG. 16 is a control block diagram of the electric actuator.

Next, with reference to FIG. 16, description is made of feedback control using the magnetic sensor 70.

As illustrated in FIG. 16, when a target value is transmitted to a control device 80, a control signal is transmitted from a controller 81 of the control device 80 to the driving motor 10. The target value is, for example, a stroke value calculated by an ECU provided at an upper position of a vehicle based on an operation amount when the operation amount is input to the ECU.

When the driving motor 10 receives the control signal, the driving motor 10 starts the rotational drive, and the driving force thereof is transmitted to the ball screw shaft 24 through intermediation of the planetary-gear speed reduction mechanism 18, the drive gear 30, the driven gear 31, and the ball screw nut 23, and the ball screw shaft 24 thus advances. As a result, the ball screw shaft 24 advances (or retreats) in the direction parallel to the output shaft 10a of the driving motor 10. With this, the device of the object to be operated arranged on the distal end portion side (actuator head side) of the ball screw shaft 24 is operated.

At this time, the stroke value (position in the axial direction) of the ball screw shaft 24 is detected by the magnetic sensor 70. The detection value detected by the magnetic sensor 70 is transmitted to a comparison portion 82 of the control device 80, and a difference between the detection value and the target value is calculated. Then, the driving motor 10 is driven until the detection value matches the target value. When the electric actuator 1 of this embodiment is applied to, for example, a shift-by-wire system, a shift position can reliably be controlled by feeding back the stroke value detected by the magnetic sensor 70 to control the position of the ball screw shaft 24 in such a manner.

The configuration and the operation of the electric actuator 1 of this embodiment are described above. Now, regarding the electric actuator 1 of this embodiment, description is made of actions and effects of the present invention.

As described above, the sensor target according to this embodiment is mounted to the ball screw shaft 24 serving as the movable part configured to output the linear motion. The sensor target comprises the permanent magnet 73 and the magnet holder 74 configured to hold the permanent magnet 73. One pair or a plurality of pairs of the fitting claws 741 capable of being fitted to the outer peripheral surface of the ball screw shaft 24 are formed on the magnet holder 74 (see FIG. 14A). With the sensor target having such a configuration, an operator can mount the permanent magnet 73 to the ball screw shaft 24 by so-called snap fitting through use of elasticity of the paired fitting claws 741 (FIG. 10). Thus, the permanent magnet 73 can reliably be mounted to the ball screw shaft 24 without backlash, and excellent detection precision can be acquired compared to the related art. Moreover, the mounting can be carried out without adhesive, screws, or the like. Thus, only a very simple operation is required, and hence ease of operation is also excellent. Moreover, through use of the sensor target comprising the permanent magnet 73, the position of the permanent magnet 73 can be detected in the non-contact manner by the magnetic sensors 70. Thus, the number of parts required for the position detection can be reduced compared to the related art, thereby being capable of reducing the size of the electric actuator 1 comprising the target and the ball screw shaft 24. As a matter of course, when the sensor target has such a simple configuration, and can be mounted to the ball screw shaft 24 through such a simple operation, manufacturing cost and working cost can also be suppressed to low, which is also preferred for series production of the electric actuator 1. As a specific example of deployment as a plurality of types along with the series production of the electric actuator 1, an electric parking brake mechanism for vehicles including two-wheeled vehicles, an electric/hydraulic brake mechanism, an electric shift change mechanism, and an electric power steering as well as a 2WD/4WD electric switching mechanism and an electric shift change mechanism for an outboard engine (for a vessel propulsion engine) can be exemplified.

In particular, when the magnet holder 74 having the plurality of pairs of the fitting claws 741 is made of resin, the respective pairs of the fitting claws 741 are easily spread apart by pushing the magnet holder 74 over the ball screw shaft 24. Thus, ease of operation of mounting to the target mounting position (cutout portion 241) of the ball screw shaft 24 can further be increased.

Figure 17:
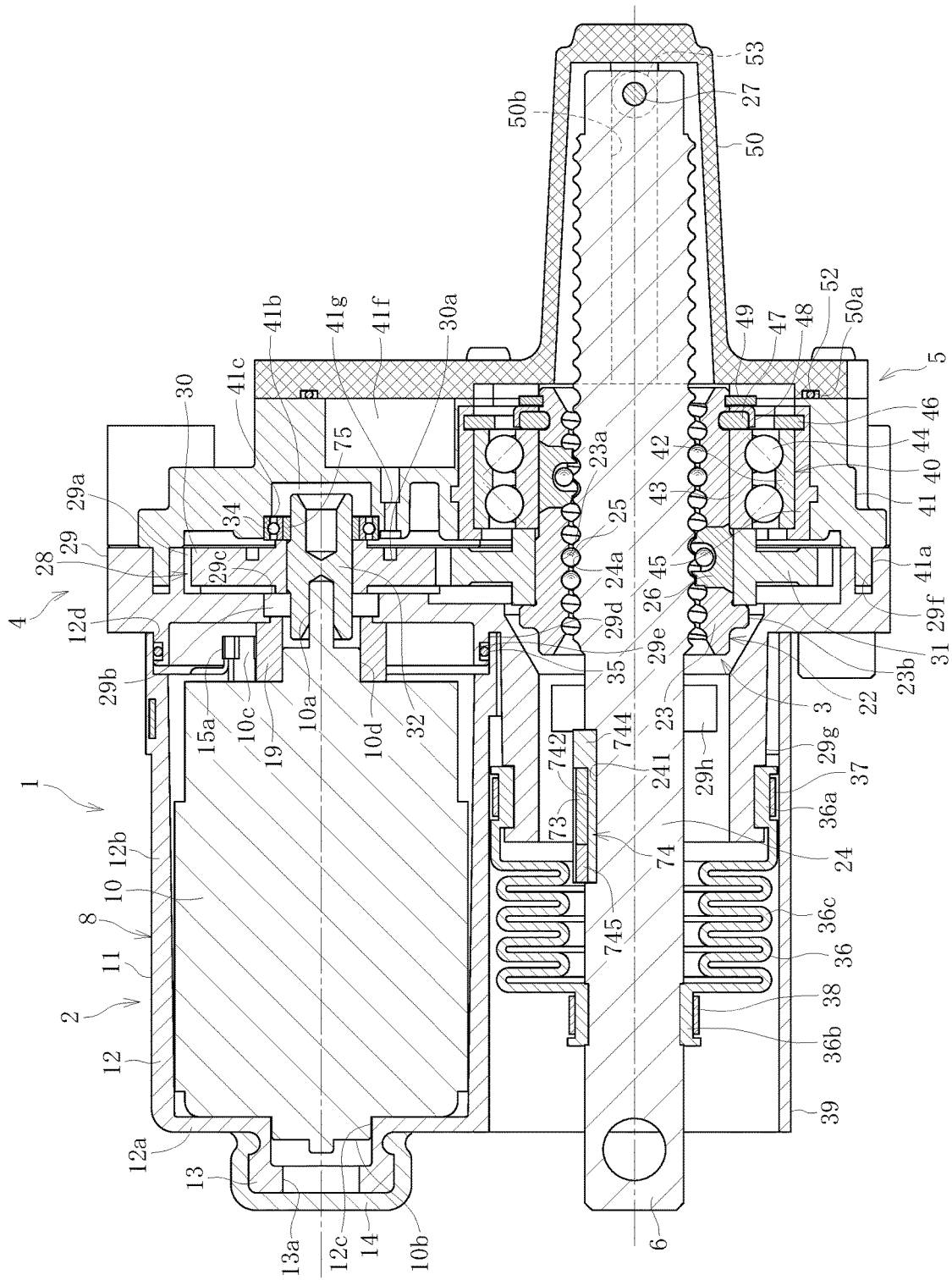
FIG. 17 is a vertical sectional view of the electric actuator according to another embodiment of the present invention.

When the speed reduction mechanism part 9 and the lock mechanism part 7 are not required, as illustrated in FIG. 17, the electric actuator 1 without the speed reduction mechanism part 9 and the lock mechanism part 7 can be formed. The electric actuator 1 illustrated in FIG. 17 is configured, compared to the electric actuator 1 illustrated in FIG. 1, by eliminating the speed reduction mechanism part 9, directly coupling the motor part 8 and the driving force transmission part 4 to each other, and replacing the shaft case 50 by one without the holder portion 66 to which the lock mechanism part 7 is mounted. In this case, the speed reduction mechanism part 9 is not provided. Thus, the output shaft 10a of the driving motor 10 is press-fitted to the gear boss 32, and the rolling bearing 33 on the transmission gear case 29 side configured to support the gear boss 32 is omitted. Moreover, a member to be fitted to the motor adaptor 19, to which the output shaft 10a of the driving motor 10 is mounted, is changed from the speed reduction gear case 17 to the transmission gear case 29, and is thus replaced by one having a different shape conforming to a fitting shape of the member to be fitted to the motor adaptor 19. The other configurations are the same as those of the embodiment illustrated in FIG. 1. The electric actuator 1 of the embodiment illustrated in FIG. 17 is controlled to operate basically in the same manner as in the embodiment illustrated in FIG. 1 except that the driving force from the driving motor 10 is directly transmitted to the driving force transmission part 4 without intermediation of the speed reduction mechanism part 9. Thus, description of the control and the operation is omitted.

As described above, the electric actuator 1 illustrated in FIG. 17 can be formed by replacing only a part of the components of the electric actuator 1 illustrated in FIG. 1, and the other many components can be the same components, thereby being capable of achieving the series production at a low cost. In particular, in the embodiment, all of an inner diameter of the motor case 11 on the opening portion 12d side, an outer diameter of the speed reduction gear case 17 on the motor case 11 side, and an outer diameter of the transmission gear case 29 on the speed reduction gear case 17 side are set equal, and the motor case 11 is thus configured to be capable of being fitted to any of the speed reduction gear case 17 and the transmission gear case 29. Therefore, even when the speed reduction mechanism part 9 is omitted, the motor part 8 and the driving force transmission part 4 can be coupled to one another by only replacing the motor adaptor 19 with other motor adaptor. Further, the shaft case 50, the boot cover 39, and (the cylindrical portion 29g of) the transmission gear case 29 configured to receive the ball screw shaft 24 can directly be used without changes, and hence the ball screw shaft 24 which is completely the same as that of the previous embodiment can also be used. Thus, the same magnetic sensors 70 and sensor target (the permanent magnet 73 and the magnet holder 74) forming the position detection device which are completely the same as those of the previous embodiment can also be used. Consequently, also in a case in which the position detection device is mounted, the series production of the electric actuator 1 can be achieved at low cost.

Moreover, the electric actuator comprising both of the speed reduction mechanism part 9 and the lock mechanism part 7 and the electric actuator without both of them are described in the above-mentioned embodiment, but the electric actuator comprising any one of them can be formed. Moreover, while, in the above-mentioned examples, the shaft case 50 is changed depending on the absence or presence of the lock mechanism part 7, a shape or a size of the shaft case 50 may be changed in accordance with the length of the ball screw shaft 24.

The motion conversion mechanism part 3 is not limited to the ball screw 22, and may be a sliding screw device. However, the ball screw 22 is more preferred in terms of reducing the rotation torque and downsizing the driving motor 10. Moreover, in the above-mentioned embodiments, although the configuration of using the double-row angular contact ball bearing as the support bearing 40 configured to support the motion conversion mechanism part 3 is exemplified, the support bearing 40 is not limited to this example. A pair of single-row angular contact ball bearings may be used in combination. Moreover, for the support bearing 40, not limited to the angular contact ball bearing, another double-row bearing using, for example, a deep groove ball bearing may be applied.

The speed reduction mechanism part 9 may be a speed reduction mechanism other than the planetary-gear speed reduction mechanism 18. Moreover, the driving force transmission part 4 may also have a function as a speed reduction mechanism through changing the gear ratio between the drive gear 30 and the driven gear 31.

Moreover, the present invention is not limited to the above-mentioned embodiments. As a matter of course, the present invention may be carried out in various modes without departing from the spirit of the present invention. The scope of the present invention is defined in claims, and encompasses equivalents described in claims and all changes within the scope of claims.

The invention claimed is:

1. A sensor target, which forms an electric actuator configured to convert a rotary motion generated through drive by a motor into a linear motion in a direction parallel to an output shaft of the motor to output the linear motion, and is mounted to a movable part, which is arranged in parallel with the output shaft and is configured to perform the linear motion, the sensor target comprising:
a magnet; and
a magnet holder configured to hold the magnet,
wherein the magnet holder comprises:
one pair or a plurality of pairs of fitting claws capable of being fitted to an outer peripheral surface of the movable part; and
a fitting recessed portion, which is formed on an opposite side of a protruding side of the fitting claws, and is configured to receive the magnet fitted therein, and
wherein the fitting recessed portion comprises:
a pair of side wall portions;
a first sandwiching portion, which is formed integrally with the pair of side wall portions; and
a second sandwiching portion, which is capable of sandwiching the magnet together with the first sandwiching portion.

2. The sensor target according to claim 1,
wherein the fitting recessed portion further comprises an opening portion on a side opposite to the first sandwiching portion,
wherein the second sandwiching portion is formed independently of the pair of side wall portions and the first sandwiching portion, and
wherein the magnet and the second sandwiching portion are insertable from a side of the opening portion toward the fitting recessed portion.

3. A movable-part unit, comprising:
the sensor target of claim 2; and
the movable part to which the sensor target is mounted through fitting.

4. The movable-part unit according to claim 3, wherein a cutout portion is formed in the movable part, and the sensor target is fitted to the cutout portion.

5. An electric actuator, comprising:
the movable-part unit of claim 4; and
a magnetic sensor, which is arranged around the movable part, and is configured to detect a position of the magnet.

6. The electric actuator according to claim 5, further comprising:
the motor; and
a motion conversion mechanism configured to convert a rotary motion generated through drive by the motor into a linear motion in a direction parallel to an output shaft of the motor.

7. An electric actuator, comprising:
the movable-part unit of claim 3; and
a magnetic sensor, which is arranged around the movable part, and is configured to detect a position of the magnet.

8. The electric actuator according to claim 7, further comprising:
the motor; and
a motion conversion mechanism configured to convert a rotary motion generated through drive by the motor into a linear motion in a direction parallel to an output shaft of the motor.

9. A movable-part unit, comprising:
the sensor target of claim 1; and
the movable part to which the sensor target is mounted through fitting.

10. The movable-part unit according to claim 9, wherein a cutout portion is formed in the movable part, and the sensor target is fitted to the cutout portion.

11. An electric actuator, comprising:
the movable-part unit of claim 10; and
a magnetic sensor, which is arranged around the movable part, and is configured to detect a position of the magnet.

12. The electric actuator according to claim 11, further comprising:
the motor; and
a motion conversion mechanism configured to convert a rotary motion generated through drive by the motor into a linear motion in a direction parallel to an output shaft of the motor.

13. An electric actuator, comprising:
the movable-part unit of claim 9; and
a magnetic sensor, which is arranged around the movable part, and is configured to detect a position of the magnet.

14. The electric actuator according to claim 13, further comprising:
the motor; and
a motion conversion mechanism configured to convert a rotary motion generated through drive by the motor into a linear motion in a direction parallel to an output shaft of the motor.

* * * * *